United States Patent
Hao et al.

(10) Patent No.: US 9,313,757 B2
(45) Date of Patent: Apr. 12, 2016

(54) BASE STATION, TERMINAL, SYSTEM AND METHOD FOR DATA TRANSMITTING IN TIME-DIVISION DUPLEX SYSTEM

(75) Inventors: Peng Hao, Shenzhen (CN); Bo Dai, Shenzhen (CN); Bin Yu, Shenzhen (CN)

(73) Assignee: ZTE Corporation (CN)

( * ) Notice: Subject to any disclaimer, the term of this patent is extended or adjusted under 35 U.S.C. 154(b) by 143 days.

(21) Appl. No.: 14/236,164

(22) PCT Filed: Dec. 21, 2011

(86) PCT No.: PCT/CN2011/084373
§ 371 (c)(1),
(2), (4) Date: Jan. 30, 2014

(87) PCT Pub. No.: WO2012/155514
PCT Pub. Date: Nov. 22, 2012

(65) Prior Publication Data
US 2014/0177491 A1    Jun. 26, 2014

(30) Foreign Application Priority Data

Aug. 1, 2011 (CN) .......................... 2011 1 0218399

(51) Int. Cl.
*H04W 56/00* (2009.01)
*H04W 72/12* (2009.01)
(Continued)

(52) U.S. Cl.
CPC ........... *H04W 56/001* (2013.01); *H04L 1/1854* (2013.01); *H04L 1/1864* (2013.01); *H04W 72/0446* (2013.01); *H04W 72/1278* (2013.01); *H04W 72/14* (2013.01)

(58) Field of Classification Search
CPC .......... H04W 56/001; H04W 72/0446; H04W 72/14; H04W 72/1278; H04L 1/1864; H04L 1/1854

USPC ......... 370/276, 277, 280, 310, 328, 329, 330, 370/336, 345, 350, 431, 442, 464, 498, 370/503; 455/403, 422.1, 7, 24
See application file for complete search history.

(56) References Cited

U.S. PATENT DOCUMENTS

| 2008/0186950 | A1  | 8/2008 | Zhu et al. |
| 2011/0096701 | A1* | 4/2011 | Lin .............................. 370/280 |
| 2013/0028205 | A1* | 1/2013 | Damnjanovic et al. ....... 370/329 |

FOREIGN PATENT DOCUMENTS

| CN | 102075949 | 5/2011 |
| CN | 102104933 | 6/2011 |

(Continued)

OTHER PUBLICATIONS

Motorola Relay Design for LTE-A. 3GPP TSG RAN1 #56bis. Mar. 23-37, 2009.

(Continued)

*Primary Examiner* — Obaidul Huq
(74) *Attorney, Agent, or Firm* — Plumsea Law Group, LLC

(57) ABSTRACT

A base station, a terminal, a system and methods for performing data transmission in a Time Division Duplex (TDD) system are disclosed. One of the methods includes: the base station sending an uplink scheduling grant signaling to the terminal on a carrier m, and after receiving uplink data sent by the terminal through a Physical Uplink Shared Channel (PUSCH) on a carrier n, the base station sending an ACK/NACK feedback signaling corresponding to the PUSCH to the terminal on the carrier m; wherein, m≠n; a timing relationship between a subframe by which the base station sends the uplink scheduling grant signaling and/or the ACK/NACK feedback signaling and a subframe where the PUSCH is located is identical with a Hybrid Automatic Repeat Request (HARQ) timing relationship corresponding to an uplink/downlink configuration of the carrier m or the carrier n.

4 Claims, 6 Drawing Sheets

(51) Int. Cl.
*H04L 1/18* (2006.01)
*H04W 72/04* (2009.01)
*H04W 72/14* (2009.01)

(56) References Cited

FOREIGN PATENT DOCUMENTS

WO 2010/122419 10/2010
WO 2011078581 A2 6/2011

OTHER PUBLICATIONS

International Search Report and Written Opinion mailed Oct. 22, 2010 in International Application No. PCT/IB2010/000918.
HARQ and Cross-carrier Scheduling for Different TDD Configurations, CATT, 3GPP TSG RAN WG2 Meeting#74, Barcelona, Spain, May 9-13, 2011.

* cited by examiner

--Prior Art--

FIG. 6

|     | Radio frame n | | | | | | | | | | Radio frame n+1 | | | | | | | | | |
|-----|---|---|---|---|---|---|---|---|---|---|---|---|---|---|---|---|---|---|---|---|
|     | 0 | 1 | 2 | 3 | 4 | 5 | 6 | 7 | 8 | 9 | 0 | 1 | 2 | 3 | 4 | 5 | 6 | 7 | 8 | 9 |
| CC1 | D | S | U | U | D | D | S | U | U | D | D | S | U | U | D | D | S | U | U | D |
|     |   | G3 |   |   | G4 |   | G1 |   |   | G2 |   | G3 |   |   | G4 |   | G1 |   |   | G2 |
|     |   | P3 |   |   | P4 |   | P1 |   |   | P2 |   | P3 |   |   | P4 |   | P1 |   |   | P2 |
| CC2 | D | S | U | U | U | D | S | U | U | U | D | S | U | U | U | D | S | U | U | U |
|     |   |   | 1 | 2 | X |   |   | 3 | 4 | X |   |   | 1 | 2 | X |   |   | 3 | 4 | X |

BASE STATION, TERMINAL, SYSTEM AND METHOD FOR DATA TRANSMITTING IN TIME-DIVISION DUPLEX SYSTEM

TECHNICAL FIELD

The present document relates to the field of mobile communication, and especially, to a base station, a terminal, a system and a method for performing data transmission in a Time Division Duplex (TDD) system.

BACKGROUND OF THE RELATED ART

A frame structure of a TDD mode of a Long Term Evolution (LTE) system (also called as a frame structure type 2) is as shown in FIG. 1. In this kind of frame structure, a 10 ms (307200 Ts, 1 ms=30720 Ts)-radio frame is divided into two half-frames, each half-frame is 5 ms (153600 Ts) long. Each half-frame contains 5 subframes with a length of 1 ms respectively. The function of each subframe is as shown in Table 1, wherein, D represents a downlink subframe used for transmitting downlink signals. U represents an uplink subframe used for transmitting uplink signals. An uplink subframe or a downlink subframe is then divided into 2 0.5 ms-time slots. S represents a special subframe, which contains 3 special time slots, namely a Downlink Pilot Time Slot (DwPTS), a Guard Period (GP) and an Uplink Pilot Time Slot (UpPTS). In an actual system, a terminal will be informed of uplink/downlink configuration indexes through broadcast message.

TABLE 1

| | | Uplink/downlink configuration | | | | | | | | | |
|---|---|---|---|---|---|---|---|---|---|---|---|
| Config- | Switch-point | Subframe number | | | | | | | | | |
| uration | periodicity | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The resource allocation in the LTE system takes a Resource Block (RB) as a unit, an RB occupies 12 Resource Elements (REs) in a frequency domain, an RE occupies one Single Carrier-Frequency Division Multiple Access (SC-FDMA) symbol in a time domain, an RB occupies one time slot in the time domain, that is, an RB occupies 7 SC-FDMA symbols under the condition of normal Cyclic Prefix (CP) and occupies 6 SC-FDMA symbols under the condition of extended CP. A relation between the resource block and the resource unit is as shown in FIG. 2.

In the LTE system, uplink/downlink data transmission can use the Hybrid Automatic Repeat Request (HARQ) technology.

The uplink data transmission uses the synchronous adaptive HARQ technology or the synchronous non-adaptive HARQ technology, and a main process includes the following steps.

In step (1), a base station informs a terminal of information such as time-frequency resources and a modulation coding scheme and so on used in the data transmission through uplink scheduling information (Uplink Grant) in a downlink control signaling; and the uplink scheduling information is sent through an uplink scheduling grant signaling.

In step (2), the terminal uses a Physical Uplink Shared Channel (PUSCH) to send uplink data according to the information.

In step (3), the base station decodes the uplink data after receiving the uplink data, and informs the terminal of a decoding result. If receiving the uplink data correctly, the base station sends an Acknowledgement (ACK), and if receiving the uplink data incorrectly, the base station sends a Negative Acknowledgement (NACK). With regard to the adaptive HARQ technology, when the data are received incorrectly, the base station also can send UL GRANT to change information such as a modulation coding scheme and time-frequency resources of a retransmission packet besides sending the NACK.

In step (4), the terminal uses the PUSCH to resend uplink data (i.e., the retransmission packet) after receiving the NACK.

In step (5), the base station combines the uplink data with respect to the same data packet sent at each time and decodes the combined uplink data. Then, the operations of step (3) and step (4) are repeated until the number of times of retransmission reaches a maximum value regulated by the system.

A data packet occupies one HARQ process. In order to enhance the usage efficiency of system resources, during the process of transmitting or retransmitting a data packet, the base station also can use other processes to transmit a new data packet. For example, a TDD uplink/downlink configuration 1 supports 4 processes at most (a timing relationship is as shown in FIG. 3), when a data packet in a process 1 is transmitted (it is assumed that a data packet of the process 1 is transmitted on a subframe 2 of a radio frame n, if this data packet is transmitted incorrectly, a subframe 2 of a radio frame n+1 is a retransmission packet of this data packet; and if this data packet is transmitted correctly, the subframe 2 of the radio frame n+1 is another new data packet of the process 1), the base station can use a process 2, process 3 and process 4 to transmit new data packets.

Since the synchronous HARQ technology is used in uplink, there exists a fixed timing relationship between the Uplink Grant, PUSCH and ACK/NACK. With regard to the TDD mode, this timing relationship is related to uplink/downlink configurations. When the Uplink Grant or ACK/NACK are sent on a subframe n and the PUSCH is sent on a subframe n+k, a value of k is as shown in Table 2. In addition, with regard to an uplink/downlink configuration 0, for the ACK/NACK sent on a subframe 1 and a subframe 6, PUSCH is sent on a subframe n+7, and for the ACK/NACK sent on a subframe 0 and a subframe 5, PUSCH may be sent on a subframe n+4 or the subframe n+7. For the Uplink Grant sent on the subframe 0, subframe 1, subframe 5 and subframe 6, PUSCH may be sent on the subframe n+k and/or the subframe n+7.

Note: when a value of the n+k does not belong to the subframe scope (0~9) of the current radio frame, the n+k indicates a corresponding subframe within the next radio frame. For example, when n=6 and k=6, the n+k indicates a subframe 2 of the next radio frame.

TABLE 2

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |

TABLE 2-continued

| TDD UL/DL Configuration | \multicolumn{10}{c}{subframe number n} | | | | | | | | | |
|---|---|---|---|---|---|---|---|---|---|---|
| | 0 | 1 | 2 | 3 | 4 | 5 | 6 | 7 | 8 | 9 |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

The ACK/NACK sent on a subframe i corresponds to the PUSCH sent on a subframe i-k, a value of k is as shown in Table 3. In addition, with regard to the uplink/downlink configuration 0, the ACK/NACK sent on the subframe 0 and the subframe 5 also may correspond to the PUSCH sent on a subframe i-6.

TABLE 3

| TDD UL/DL Configuration | \multicolumn{10}{c}{subframe number i} | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | 6 | 6 | |
| 4 | | | | | | | | 6 | 6 | |
| 5 | | | | | | | | 6 | | |
| 6 | 6 | 4 | | | | 7 | 4 | | | 6 |

In order to implement an Enhanced Inter-Cell Interference Coordination (EICIC) better, the Release (R) 10 of LTE-Advanced supports the cross-carrier scheduling, that is, control information and data are not sent on the same carrier. As shown in FIG. 4, scheduling information and ACK/NACK of the PUSCH of a Component Carrier (CC) 1 are sent on a CC 2.

With regard to the TDD mode, the R10 of LTE-Advanced only supports the carrier aggregation within the same band as shown in FIG. 4. At this point, different CCs are required to use the same uplink/downlink configuration, thus different CCs have the identical HARQ timing relationship, and no problem will occur in the cross-carrier scheduling.

In order to utilize the resources more flexibly, the R11 of LTE-Advanced will support the carrier aggregation of different bands, and carriers located in different bands can be configured with different uplink/downlink proportions. Since different uplink/downlink proportions have different HARQ timing relationships, when different uplink/downlink configurations are used on different carriers, how to make maximal use of the existing HARQ timing relationships to implement the cross-carrier scheduling and maintain a lower complexity of devices in the meantime is a problem required to be solved urgently.

SUMMARY OF THE INVENTION

In order to solve the above problem, the present document provides a base station, a terminal, a system and a method for performing data transmission in a TDD system, which maximally uses the existing HARQ timing relationships to implement the cross-carrier scheduling.

A data transmission method for a Time Division Duplex (TDD) system comprises:

a base station sending an uplink scheduling grant signaling to a terminal on a carrier m, and after the base station receives uplink data sent by the terminal through a Physical Uplink Shared Channel (PUSCH) on a carrier n, the base station sending an ACK/NACK feedback signaling corresponding to the PUSCH to the terminal on the carrier m;

wherein, m≠n; a timing relationship between a subframe by which the base station sends the uplink scheduling grant signaling and/or the ACK/NACK feedback signaling and a subframe where the PUSCH is located is identical with a Hybrid Automatic Repeat Request (HARQ) timing relationship corresponding to an uplink/downlink configuration of the carrier m or the carrier n.

Wherein, the timing relationship includes:

(1). an HARQ timing relationship corresponding to an uplink/downlink configuration used by a carrier with more uplink subframes or less downlink subframes between the carrier m and the carrier n; or, (2). an HARQ timing relationship corresponding to an uplink/downlink configuration used by a carrier with less uplink subframes or more downlink subframes between the carrier m and the carrier n.

The data transmission method further comprises:

if a subframe for sending the uplink scheduling grant signaling and/or the ACK/NACK feedback signaling is an uplink subframe, the base station not performing PUSCH scheduling on corresponding processes on a subframe where the PUSCH corresponding to the signaling is located.

The data transmission method further comprises:

if a certain subframe in the carrier n has no corresponding downlink subframe for sending the uplink scheduling grant signaling or the ACK/NACK feedback signaling on the carrier m according to the timing relationship, the base station not performing PUSCH scheduling on corresponding processes on the subframe.

The data transmission method further comprises:

if a subframe where the PUSCH for sending the uplink data on the carrier n is located is a downlink subframe according to the above timing relationship, the base station not performing PUSCH scheduling on corresponding processes on the subframe.

A data transmission method for a Time Division Duplex (TDD) system comprises:

after receiving an uplink scheduling grant signaling and/or an ACK/NACK feedback signaling sent by a base station on a carrier m, a terminal sending uplink data through a Physical Uplink Shared Channel (PUSCH) on a carrier n;

wherein, m≠n; a timing relationship between a subframe where the PUSCH is located and a subframe by which the base station sends the uplink scheduling grant signaling and/or the ACK/NACK feedback signaling is identical with a Hybrid Automatic Repeat Request (HARQ) timing relationship corresponding to an uplink/downlink configuration of the carrier m or the carrier n.

Wherein, the timing relationship includes:

(1). an HARQ timing relationship corresponding to an uplink/downlink configuration used by a carrier with more uplink subframes or less downlink subframes between the carrier m and the carrier n; or, (2). an HARQ timing relationship corresponding to an uplink/downlink configuration used by a carrier with less uplink subframes or more downlink subframes between the carrier m and the carrier n.

The data transmission method further comprises:

if a subframe for sending the uplink scheduling grant signaling and/or the ACK/NACK feedback signaling is an uplink subframe, the terminal not sending the PUSCH on a corresponding subframe of the carrier n.

The data transmission method further comprises:

if a certain subframe in the carrier n has no corresponding downlink subframe for sending the uplink scheduling grant signaling or the ACK/NACK feedback signaling on the carrier m according to the timing relationship, the terminal not sending the PUSCH on the subframe.

The data transmission method further comprises:

if a subframe where the PUSCH for sending the uplink data on the carrier n is located is a downlink subframe according to the timing relationship, the terminal not sending the PUSCH on the subframe.

A data transmission method for a Time Division Duplex (TDD) system comprises:

a base station specifying a Hybrid Automatic Repeat Request (HARQ) timing relationship corresponding to an uplink/downlink configuration as an HARQ timing relationship in cross-carrier scheduling and informing a terminal; and the base station sending an uplink scheduling grant signaling to the terminal on a subframe corresponding to the HARQ timing relationship on a carrier m, and after receiving uplink data sent by the terminal through a Physical Uplink Shared Channel (PUSCH) on a carrier n, sending an ACK/NACK feedback signaling corresponding to the PUSCH to the terminal on the subframe on the carrier m according to the HARQ timing relationship;

wherein, m≠n.

Wherein, the step of a base station specifying an HARQ timing relationship corresponding to an uplink/downlink configuration as an HARQ timing relationship in cross-carrier scheduling and informing a terminal comprises:

the base station informing the terminal of the HARQ timing relationship through any one of the following signalings:

a proprietary signaling for a terminal or a group of terminals;

a dedicated signaling for a cell or a group of cells; or a proprietary signaling for a carrier or a group of carriers.

The data transmission method further comprises:

if a subframe for sending the uplink scheduling grant signaling and/or the ACK/NACK feedback signaling is an uplink subframe, the base station not performing PUSCH scheduling on corresponding processes on a subframe where the PUSCH corresponding to the signaling is located.

The data transmission method further comprises:

if a certain subframe in the carrier n has no corresponding downlink subframe for sending the uplink scheduling grant signaling or the ACK/NACK feedback signaling on the carrier m according to the timing relationship, the base station not performing PUSCH scheduling on corresponding processes on the subframe.

The data transmission method further comprises:

if a subframe where the PUSCH for sending the uplink data on the carrier n is located is a downlink subframe according to the above timing relationship, the base station not performing PUSCH scheduling on corresponding processes on the subframe.

A data transmission method for a Time Division Duplex (TDD) system comprises:

after receiving an uplink scheduling grant signaling and/or an ACK/NACK feedback signaling sent by a base station on a carrier m, a terminal sending uplink data through a Physical Uplink Shared Channel (PUSCH) on a carrier n; wherein, m≠n; and after receiving a notification from the base station, the terminal sending the uplink data through the PUSCH on a subframe according to a Hybrid Automatic Repeat Request (HARQ) timing relationship specified in the notification.

The data transmission method further comprises:

if a subframe for sending the uplink scheduling grant signaling and/or the ACK/NACK feedback signaling is an uplink subframe, the terminal not sending the PUSCH on a corresponding subframe of the carrier n.

The data transmission method further comprises:

if a certain subframe in the carrier n has no corresponding downlink subframe for sending the uplink scheduling grant signaling or the ACK/NACK feedback signaling on the carrier m according to the timing relationship, the terminal not sending the PUSCH on the subframe.

The data transmission method further comprises:

if a subframe where the PUSCH for sending the uplink data on the carrier n is located is a downlink subframe according to the above timing relationship, the terminal not sending the PUSCH on the subframe.

A base station for performing data transmission in a Time Division Duplex (TDD) system comprises: a sending module and a receiving module, wherein, the sending module is configured to: send an uplink scheduling grant signaling to a terminal on a carrier m, and after the receiving module receives uplink data sent by the terminal through a Physical Uplink Shared Channel (PUSCH) on a carrier n, send an ACK/NACK feedback signaling corresponding to the PUSCH to the terminal on the carrier m; and the receiving module is configured to: receive the uplink data sent by the terminal through the PUSCH on the carrier n;

wherein, m≠n; a timing relationship between a subframe by which the base station sends the uplink scheduling grant signaling and/or the ACK/NACK feedback signaling and a subframe where the PUSCH is located is a Hybrid Automatic Repeat Request (HARQ) timing relationship corresponding to an uplink/downlink configuration of the carrier m or the carrier n.

Wherein, the timing relationship includes:

(1). an HARQ timing relationship corresponding to an uplink/downlink configuration used by a carrier with more uplink subframes or less downlink subframes between the carrier m and the carrier n; or, (2). an HARQ timing relationship corresponding to an uplink/downlink configuration used by a carrier with less uplink subframes or more downlink subframes between the carrier m and the carrier n.

A terminal for performing data transmission in a Time Division Duplex (TDD) system comprises: a receiving module and a sending module, wherein, the receiving module is configured to: receive an uplink scheduling grant signaling and/or an ACK/NACK feedback signaling sent by a base station on a carrier m; and the sending module is configured to: after the receiving module receives the uplink scheduling grant signaling and/or the ACK/NACK feedback signaling sent by the base station on the carrier m, send uplink data through a Physical Uplink Shared Channel (PUSCH) on a carrier n;

wherein, m≠n; a timing relationship between a subframe where the PUSCH is located and a subframe by which the base station sends the uplink scheduling grant signaling and/or the ACK/NACK feedback signaling is a Hybrid Automatic Repeat Request (HARQ) timing relationship corresponding to an uplink/downlink configuration of the carrier m or the carrier n.

Wherein, the timing relationship includes:

(1). an HARQ timing relationship corresponding to an uplink/downlink configuration used by a carrier with more uplink subframes or less downlink subframes between the carrier m and the carrier n; or, (2). an HARQ timing relationship corresponding to an uplink/downlink configuration used by a carrier with less uplink subframes or more downlink subframes between the carrier m and the carrier n.

A base station for performing data transmission in a Time Division Duplex (TDD) system comprises: a configuration module, a sending module and a receiving module, wherein, the configuration module is configured to: specify a Hybrid Automatic Repeat Request (HARQ) timing relationship corresponding to an uplink/downlink configuration as an HARQ timing relationship in cross-carrier scheduling and inform a terminal;

the sending module is configured to: send an uplink scheduling grant signaling to the terminal on a subframe corresponding to the HARQ timing relationship on a carrier m, and after the receiving module receives uplink data sent by the terminal through a Physical Uplink Shared Channel (PUSCH) on a carrier n, send an ACK/NACK feedback signaling corresponding to the PUSCH to the terminal on the subframe on the carrier m according to the HARQ timing relationship; and the receiving module is configured to: receive the uplink data sent by the terminal through the PUSCH on the carrier n; wherein, m≠n.

Wherein, the configuration module is configured to inform the terminal of the HARQ timing relationship according to any one of the following signalings:

a proprietary signaling for a terminal or a group of terminals;

a dedicated signaling for a cell or a group of cells; or a proprietary signaling for a carrier or a group of carriers.

A terminal for performing data transmission in a Time Division Duplex (TDD) system comprises: a parsing module, a receiving module and a sending module, wherein, the parsing module is configured to: parse a Hybrid Automatic Repeat Request (HARQ) timing relationship specified in a notification sent by a base station;

the receiving module is configured to: receive an uplink scheduling grant signaling and/or an ACK/NACK feedback signaling sent by the base station on a carrier m; and the sending module is configured to: after the receiving module receives the uplink scheduling grant signaling and/or the ACK/NACK feedback signaling sent by the base station on the carrier m, send uplink data through a Physical Uplink Shared Channel (PUSCH) on a subframe on a carrier n according to the timing relationship;

wherein, m≠n.

A system for performing data transmission in a Time Division Duplex (TDD) system comprises:

any one of the above base stations and any one of the above terminals.

In conclusion, in the technical scheme provided by the embodiments of the present document, when different CCs use different uplink/downlink proportion configurations, the TDD system is enabled to use the HARQ timing relationships to implement the cross-carrier scheduling and an EICIC function, and also to maintain a lower complexity of devices in the meantime.

BRIEF DESCRIPTION OF DRAWINGS

FIG. 6 is a schematic diagram of cross-carrier scheduling according to application examples 2 and 4 of the present document.

FIG. 7 is a schematic diagram of cross-carrier scheduling according to application examples 5 and 7 of the present document.

FIG. 8 is a schematic diagram of cross-carrier scheduling according to application examples 6, 8 and 9 of the present document.

PREFERRED EMBODIMENTS OF THE INVENTION

Figure 1:
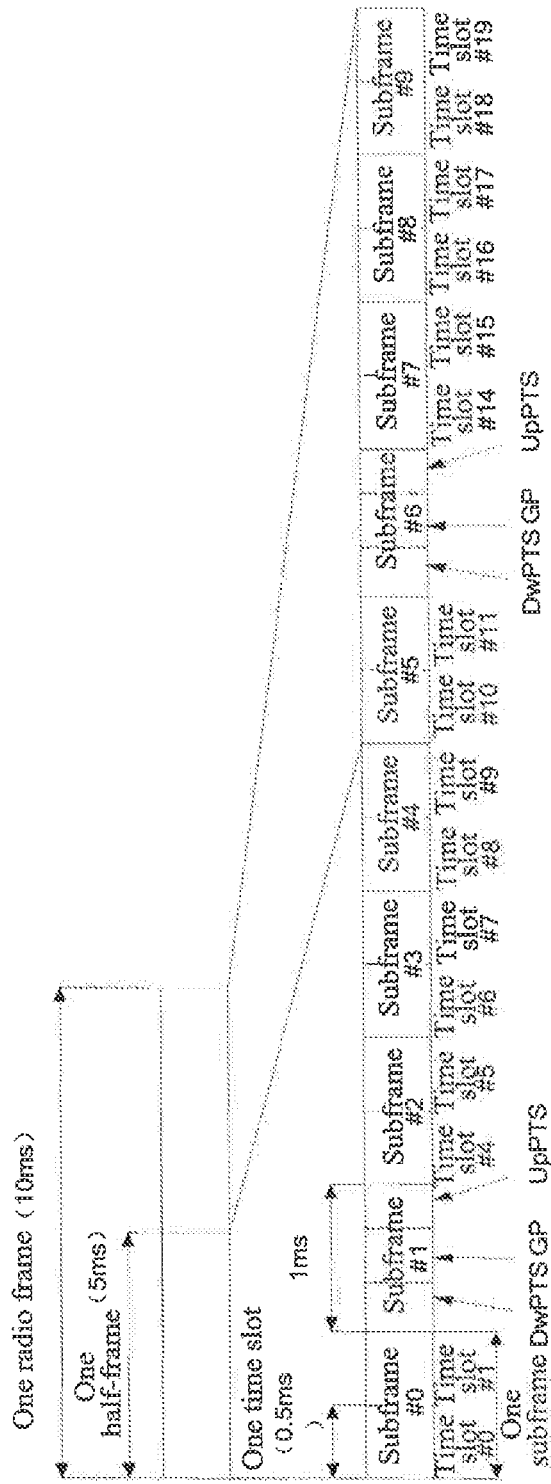
FIG. 1 is a schematic diagram of a frame structure type 2 in an LTE system.
Figures 2, 3:
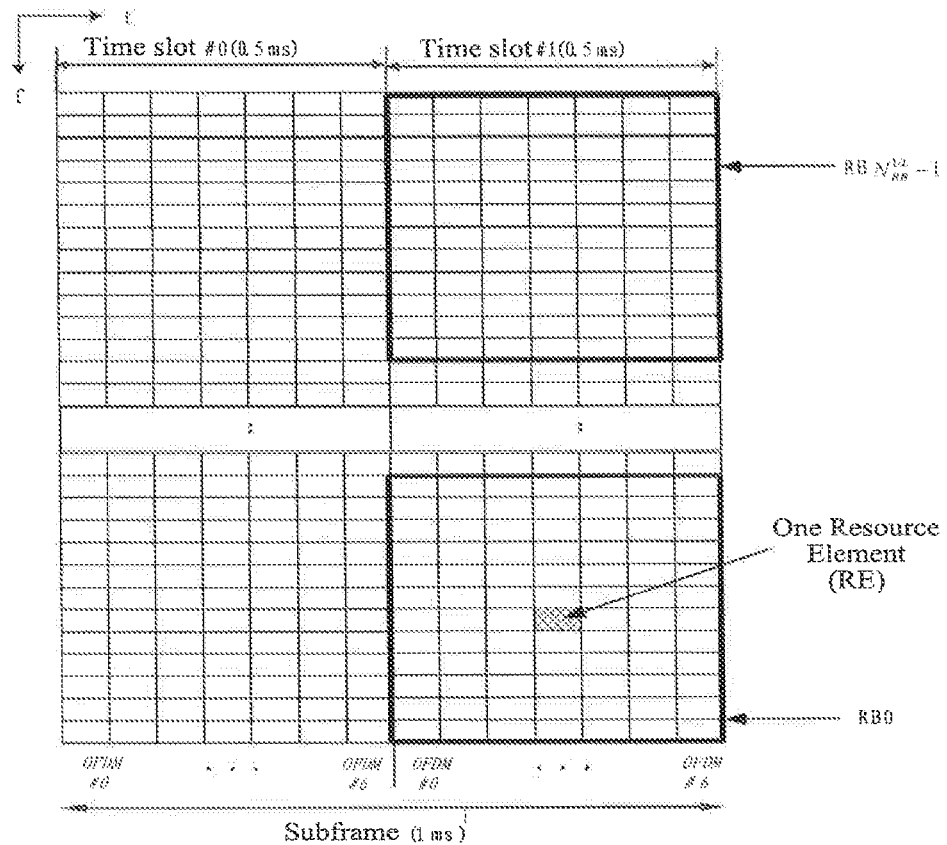
FIG. 2 is a schematic diagram of a structure of a resource block.
FIG. 3 is a schematic diagram of an HARQ process.

The specific embodiments of the present document will be further described in detail in combination with the accompanying drawings below. Here, it should be noted that all the embodiments can be optionally combined in the condition of no conflict, and all these combinations are within the protection scope of the present document.

The present document provides a base station, a terminal, a system and a method for performing data transmission in a TDD system, wherein a carrier m is used to perform cross-carrier scheduling on a carrier n, that is, an uplink scheduling grant signaling and/or an ACK/NACK feedback signaling corresponding to a PUSCH of the carrier n are sent on the carrier m.

Embodiment 1

The embodiment provides a base station for performing data transmission in a TDD system, which is used to: send an uplink scheduling grant signaling to a terminal on a carrier m, and after receiving uplink data sent by the terminal through a PUSCH on a carrier n, send an ACK/NACK feedback signaling corresponding to the PUSCH to the terminal on the carrier m; wherein, m≠n, that is, the carrier m is used to perform cross-carrier scheduling on the carrier n;

a timing relationship between a subframe by which the base station sends the uplink scheduling grant signaling and/or the ACK/NACK feedback signaling and a corresponding subframe where the PUSCH is located is identical with an HARQ timing relationship corresponding to an uplink/downlink configurations of any one of the carrier m and the carrier n.

Wherein, the above timing relationship can be any one of the following relationships:

(1). an HARQ timing relationship corresponding to an uplink/downlink configuration used by a carrier with more uplink subframes or less downlink subframes between the carrier m and the carrier n; or, (2). an HARQ timing relationship corresponding to an uplink/downlink configuration used by a carrier with less uplink subframes or more downlink subframes between the carrier m and the carrier n.

Wherein, if a subframe for sending the uplink scheduling grant signaling and/or the ACK/NACK feedback signaling is an uplink subframe according to the above timing relationship, the base station does not perform PUSCH scheduling on corresponding processes on a subframe where the PUSCH corresponding to the signaling is located.

Wherein, if a certain subframe in the carrier n has no corresponding downlink subframe for sending the uplink scheduling grant signaling or the ACK/NACK feedback signaling on the carrier m according to the above timing relationship, the base station does not perform PUSCH scheduling on corresponding processes on the subframe.

Wherein, if a subframe where the PUSCH for sending the uplink data on the carrier n is located is a downlink subframe according to the above timing relationship, the base station does not perform PUSCH scheduling on corresponding processes on the subframe.

Embodiment 2

The embodiment provides a terminal for performing data transmission in a TDD system, which is used to: after receiving an uplink scheduling grant signaling and/or an ACK/NACK feedback signaling sent by a base station on a carrier m, send uplink data through a PUSCH on a carrier n; wherein, m≠n;

a timing relationship between a subframe where the PUSCH is located and a subframe by which the base station sends the uplink scheduling grant signaling and/or the ACK/NACK feedback signaling is identical with an HARQ timing relationship corresponding to an uplink/downlink configuration of any one of the carrier m and the carrier n.

Wherein, the above timing relationship can be any one of the following relationships:

(1). an HARQ timing relationship corresponding to an uplink/downlink configuration used by a carrier with more uplink subframes or less downlink subframes between the carrier m and the carrier n; or, (2). an HARQ timing relationship corresponding to an uplink/downlink configuration used by a carrier with less uplink subframes or more downlink subframes between the carrier m and the carrier n.

Wherein, if a subframe for sending the uplink scheduling grant signaling and/or the ACK/NACK feedback signaling is an uplink subframe according to the timing relationship, the terminal does not send the PUSCH on a corresponding subframe of the carrier n.

Wherein, if a certain subframe in the carrier n has no corresponding downlink subframe for sending the uplink scheduling grant signaling or the ACK/NACK feedback signaling on the carrier m according to the timing relationship, the terminal does not send the PUSCH on the subframe.

Wherein, if a subframe where the PUSCH for sending the uplink data on the carrier n is located is a downlink subframe according to the above timing relationship, the terminal does not send the PUSCH on the corresponding subframe.

Embodiment 3

The embodiment provides a base station for performing data transmission in a TDD system, which is used to: specify an HARQ timing relationship corresponding to an uplink/downlink configuration as an HARQ timing relationship in cross-carrier scheduling and inform a terminal;

the base station is further used to: send an uplink scheduling grant signaling to the terminal on a subframe corresponding to the timing relationship on a carrier m, and after receiving uplink data sent by the terminal through a PUSCH on a carrier n, send an ACK/NACK feedback signaling corresponding to the PUSCH to the terminal on the subframe corresponding to the timing relationship on the carrier m; wherein, m≠n, that is, the carrier m is used to perform cross-carrier scheduling on the carrier n.

Wherein, the base station informs the terminal of the HARQ timing relationship in the cross-carrier scheduling through any one of the following signalings:

a proprietary signaling for a terminal or a group of terminals;

a dedicated signaling for a cell or a group of cells; or a proprietary signaling for a carrier or a group of carriers.

Wherein, if a subframe for sending the uplink scheduling grant signaling and/or the ACK/NACK feedback signaling is an uplink subframe, the base station does not perform PUSCH scheduling on corresponding processes on a subframe where the PUSCH corresponding to the signaling is located.

Wherein, if a certain subframe in the carrier n has no corresponding downlink subframe for sending the uplink scheduling grant signaling or the ACK/NACK feedback signaling on the carrier m according to the above timing relationship, the base station does not perform PUSCH scheduling on corresponding processes on the subframe.

Wherein, if a subframe where the PUSCH for sending the uplink data on the carrier n is located is a downlink subframe according to the above timing relationship, the base station does not perform PUSCH scheduling on corresponding processes on the subframe.

Embodiment 4

The embodiment provides a terminal for performing data transmission in a TDD system, which is used to: after receiving a notification from a base station, parse an HARQ timing relationship specified in the notification; and after receiving an uplink scheduling grant signaling and/or an ACK/NACK feedback signaling sent by the base station on a carrier m, send uplink data through a PUSCH on a subframe specified by the timing relationship on a carrier n.

Wherein, if a subframe for sending the uplink scheduling grant signaling and/or the ACK/NACK feedback signaling is an uplink subframe according to the timing relationship, the terminal does not send the PUSCH on a corresponding subframe of the carrier n.

Wherein, if a certain subframe in the carrier n has no corresponding downlink subframe for sending the uplink scheduling grant signaling or the ACK/NACK feedback signaling on the carrier m according to the timing relationship, the terminal does not send the PUSCH on the subframe.

Wherein, if a subframe where the PUSCH for sending the uplink data on the carrier n is located is a downlink subframe according to the above timing relationship, the terminal does not send the PUSCH on the corresponding subframe.

Embodiment 5

The embodiment provides a system for performing data transmission in a TDD system, which includes a base station and a terminal;

The base station includes any one of base stations in the embodiments 1 and 3; and the terminal includes any one of terminals in the embodiments 2 and 4.

Embodiment 6

The embodiment provides a data transmission method for a TDD system, which includes:

a base station sending an uplink scheduling grant signaling to a terminal on a carrier m, and after receiving uplink data sent by the terminal through a PUSCH on a carrier n, sending an ACK/NACK feedback signaling corresponding to the PUSCH to the terminal on the carrier m; wherein, m≠n;

a timing relationship between a subframe by which the base station sends the uplink scheduling grant signaling and/or the ACK/NACK feedback signaling and a subframe where the PUSCH is located is identical with an HARQ timing relationship corresponding to an uplink/downlink configuration of any one of the carrier m and the carrier n.

Wherein, the above timing relationship can be any one of the following relationships:

(1). an HARQ timing relationship corresponding to an uplink/downlink configuration used by a carrier with more uplink subframes or less downlink subframes between the carrier m and the carrier n; or, (2). an HARQ timing relationship corresponding to an uplink/downlink configuration used by a carrier with less uplink subframes or more downlink subframes between the carrier m and the carrier n.

Wherein, if a subframe for sending the uplink scheduling grant signaling and/or the ACK/NACK feedback signaling is an uplink subframe, the base station does not perform PUSCH scheduling on corresponding processes on a subframe where the PUSCH corresponding to the signaling is located.

Wherein, if a certain subframe in the carrier n has no corresponding downlink subframe for sending the uplink scheduling grant signaling or the ACK/NACK feedback signaling on the carrier m according to the above timing relationship, the base station does not perform PUSCH scheduling on the subframe.

Wherein, if a subframe where the PUSCH for sending the uplink data on the carrier n is located is a downlink subframe according to the above timing relationship, the base station does not perform PUSCH scheduling on corresponding processes on the subframe.

Embodiment 7

The embodiment provides a data transmission method for a TDD system, which includes:

after receiving an uplink scheduling grant signaling and/or an ACK/NACK feedback signaling sent by a base station on a carrier m, a terminal sending uplink data through a PUSCH on a carrier n; wherein, m≠n;

a timing relationship between a subframe where the PUSCH is located and a subframe by which the base station sends the uplink scheduling grant signaling and/or the ACK/NACK feedback signaling is identical with an HARQ timing relationship corresponding to an uplink/downlink configuration of any one of the carrier m and the carrier n.

Wherein, the above timing relationship can be any one of the following relationships:

(1). an HARQ timing relationship corresponding to an uplink/downlink configuration used by a carrier with more uplink subframes or less downlink subframes between the carrier m and the carrier n; or, (2). an HARQ timing relationship corresponding to an uplink/downlink configuration used by a carrier with less uplink subframes or more downlink subframes between the carrier m and the carrier n.

Wherein, if a subframe for sending the uplink scheduling grant signaling and/or the ACK/NACK feedback signaling is an uplink subframe, the terminal does not send the PUSCH on a corresponding subframe of the carrier n.

Wherein, if a certain subframe in the carrier n has no corresponding downlink subframe for sending the uplink scheduling grant signaling or the ACK/NACK feedback signaling on the carrier m according to the timing relationship, the terminal does not send the PUSCH on the subframe.

Wherein, if a subframe where the PUSCH for sending the uplink data on the carrier n is located is a downlink subframe according to the above timing relationship, the terminal does not send the PUSCH on the corresponding subframe.

Embodiment 8

The embodiment provides a data transmission method for a TDD system, which includes:

a base station specifying an HARQ timing relationship corresponding to an uplink/downlink configuration as an HARQ timing relationship in cross-carrier scheduling and informing a terminal; and the base station sending an uplink scheduling grant signaling to the terminal on a subframe corresponding to the timing relationship on a carrier m, and after receiving uplink data sent by the terminal through a PUSCH on a carrier n, sending an ACK/NACK feedback signaling corresponding to the PUSCH to the terminal on the subframe corresponding to the timing relationship on the carrier m; wherein, m≠n.

Wherein, the base station informs the terminal of the HARQ timing relationship in the cross-carrier scheduling through any one of the following signalings:

a proprietary signaling for a terminal or a group of terminals;

a dedicated signaling for a cell or a group of cells; or a proprietary signaling for a carrier or a group of carriers.

Wherein, if a subframe for sending the uplink scheduling grant signaling and/or the ACK/NACK feedback signaling is an uplink subframe, the base station does not perform PUSCH scheduling on corresponding processes on a subframe where the PUSCH corresponding to the signaling is located.

Wherein, if a certain subframe in the carrier n has no corresponding downlink subframe for sending the uplink scheduling grant signaling or the ACK/NACK feedback signaling on the carrier m according to the above timing relationship, the base station does not perform PUSCH scheduling on the subframe.

Wherein, if a subframe where the PUSCH for sending the uplink data on the carrier n is located is a downlink subframe according to the above timing relationship, the base station does not perform PUSCH scheduling on corresponding processes on the subframe.

Embodiment 9

The embodiment provides a method for data transmission in a TDD system, which includes:

after receiving a notification from a base station, a terminal parsing an HARQ timing relationship specified in the notification; and after receiving an uplink scheduling grant signaling and/or an ACK/NACK feedback signaling sent by the base station on a carrier m, the terminal sending uplink data through a PUSCH on a subframe specified by the above HARQ timing relationship on a carrier n; wherein, m≠n.

Wherein, the uplink scheduling grant signaling is sent in a Physical Downlink Control Channel (PDCCH), and it can, but is not limited to, use a Downlink Control Information (DCI) format 0 or 4.

Wherein, the ACK/NACK feedback signaling is sent in a Physical HARQ Indicator Channel (PHICH).

Wherein, if a subframe for sending the uplink scheduling grant signaling and/or the ACK/NACK feedback signaling is an uplink subframe, the terminal does not send the PUSCH on a corresponding subframe of the carrier n.

Wherein, if a certain subframe in the carrier n has no corresponding downlink subframe for sending the uplink scheduling grant signaling or the ACK/NACK feedback signaling on the carrier m according to the timing relationship, the terminal does not send the PUSCH on the subframe.

Wherein, if a subframe where the PUSCH for sending the uplink data on the carrier n is located is a downlink subframe according to the above timing relationship, the terminal does not send the PUSCH on the corresponding subframe.

The embodiment of the present document also provides a base station for performing data transmission in a TDD system, and the base station includes: a sending module and a receiving module, wherein, the sending module is configured to: send an uplink scheduling grant signaling to a terminal on a carrier m, and after the receiving module receives uplink data sent by the terminal through a PUSCH on a carrier n, send an ACK/NACK feedback signaling corresponding to the PUSCH to the terminal on the carrier m; and the receiving module is configured to: receive the uplink data sent by the terminal through the PUSCH on the carrier n;

wherein, m≠n; a timing relationship between a subframe by which the base station sends the uplink scheduling grant signaling and/or the ACK/NACK feedback signaling and a subframe where the PUSCH is located is an HARQ timing relationship corresponding to an uplink/downlink configuration of the carrier m or the carrier n.

Wherein, the timing relationship includes:

(1). an HARQ timing relationship corresponding to an uplink/downlink configuration used by a carrier with more uplink subframes or less downlink subframes between the carrier m and the carrier n; or, (2). an HARQ timing relationship corresponding to an uplink/downlink configuration used by a carrier with less uplink subframes or more downlink subframes between the carrier m and the carrier n.

The embodiment of the present document also provides a terminal for performing data transmission in a TDD system, and the terminal includes: a receiving module and a sending module, wherein, the receiving module is configured to: receive an uplink scheduling grant signaling and/or an ACK/NACK feedback signaling sent by a base station on a carrier m; and the sending module is configured to: after the receiving module receives the uplink scheduling grant signaling and/or the ACK/NACK feedback signaling sent by the base station on the carrier m, send uplink data through a PUSCH on a carrier n;

wherein, m≠n; a timing relationship between a subframe where the PUSCH is located and a subframe by which the base station sends the uplink scheduling grant signaling and/or the ACK/NACK feedback signaling is an HARQ timing relationship corresponding to an uplink/downlink configuration of the carrier m or the carrier n.

Wherein, the timing relationship includes:

(1). an HARQ timing relationship corresponding to an uplink/downlink configuration used by a carrier with more uplink subframes or less downlink subframes between the carrier m and the carrier n; or, (2). an HARQ timing relationship corresponding to an uplink/downlink configuration used by a carrier with less uplink subframes or more downlink subframes between the carrier m and the carrier n.

The embodiment of the present document also provides a base station for performing data transmission in a TDD system, and the base station includes: a configuration module, a sending module and a receiving module, wherein, the configuration module is configured to: specify an HARQ timing relationship corresponding to an uplink/downlink configuration as an HARQ timing relationship in cross-carrier scheduling and inform a terminal;

the sending module is configured to: send an uplink scheduling grant signaling to the terminal on a subframe corresponding to the HARQ timing relationship on a carrier m, and after the receiving module receives uplink data sent by the terminal through a PUSCH on a carrier n, send an ACK/NACK feedback signaling corresponding to the PUSCH to the terminal on the subframe corresponding to the HARQ timing relationship on the carrier m; and the receiving module is configured to: receive the uplink data sent by the terminal through the PUSCH on the carrier n; wherein, m≠n.

Wherein, the configuration module is configured to inform the terminal of the HARQ timing relationship according to any one of the following signalings:

a proprietary signaling for a terminal or a group of terminals;

a dedicated signaling for a cell or a group of cells; or a proprietary signaling for a carrier or a group of carriers.

The embodiment of the present document also provides a terminal for performing data transmission in a TDD system, and the terminal includes: a parsing module, a receiving module and a sending module, wherein, the parsing module is configured to: parse an HARQ timing relationship specified in a notification sent by a base station;

the receiving module is configured to: receive an uplink scheduling grant signaling and/or an ACK/NACK feedback signaling sent by the base station on a carrier m; and the sending module is configured to: after the receiving module receives the uplink scheduling grant signaling and/or the ACK/NACK feedback signaling sent by the base station on the carrier m, send uplink data through a PUSCH on a subframe specified by the timing relationship on a carrier n; wherein, m≠n.

The embodiment of the present document also provides a system for performing data transmission in a TDD system, wherein, the system includes any one of the above mentioned base stations and any one of the above mentioned terminals.

The scheme of the present document will be further described through application examples in combination with the accompanying drawings below.

Application Example 1

As shown in Table 1, a CC1 uses an uplink/downlink proportion configuration 1, a CC2 uses an uplink/downlink proportion configuration 0. The CC2 performs cross-carrier scheduling on the CC1, a PUSCH is sent on the CC1, and an uplink scheduling grant signaling and an ACK/NACK feedback signaling are sent on the CC2. A timing relationship between the uplink scheduling grant signaling, the PUSCH and the ACK/NACK signaling is identical with an HARQ timing relationship corresponding to an uplink/downlink configuration used by the CC1 (i.e., an HARQ timing relationship of the uplink/downlink configuration 1).

Figures 4, 5:
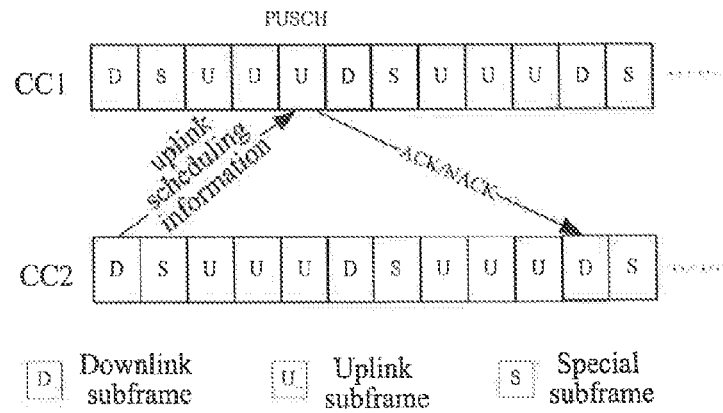
FIG. 4 is a schematic diagram of cross-carrier scheduling.
FIG. 5 is a schematic diagram of cross-carrier scheduling according to application examples 1 and 3 of the present document.

The timing relationship between the uplink scheduling grant signaling, the PUSCH and the ACK/NACK signaling is as shown in FIG. 5, in the FIG. 5, D represents a downlink subframe; S represents a special subframe; U represents an uplink subframe; 1/2/3/4 represent process serial numbers; Gm represents an uplink scheduling grant of a process m; and Pm represents an ACK/NACK feedback of the process m.

For example, with regard to a process 1, the base station sends an uplink scheduling grant signaling to the terminal on a subframe 6 of the CC2 on a radio frame n−1, the terminal sends uplink data through a PUSCH on a subframe 2 of the CC1 on a radio frame n, and the base station sends an ACK/NACK feedback signaling to the terminal on the subframe 6 of the CC2 on the radio frame n.

In the application example, since positions at which the uplink scheduling grant signaling and the ACK/NACK are sent in a process 2 and a process 4 are uplink subframes on the CC2, PUSCH scheduling is not permitted in uplink subframes corresponding to the process 2 and process 4.

Application Example 2

As shown in Table 1, a CC1 uses an uplink/downlink proportion configuration 1, a CC2 uses an uplink/downlink proportion configuration 0. The CC2 performs cross-carrier scheduling on the CC1, a PUSCH is sent on the CC1, and an uplink scheduling grant signaling and an ACK/NACK feedback signaling are sent on the CC2. A timing relationship between the uplink scheduling grant signaling, the PUSCH and the ACK/NACK signaling is identical with an HARQ timing relationship corresponding to an uplink/downlink configuration used by the CC2 (i.e., an HARQ timing relationship of the uplink/downlink configuration 0).

Figure 6:
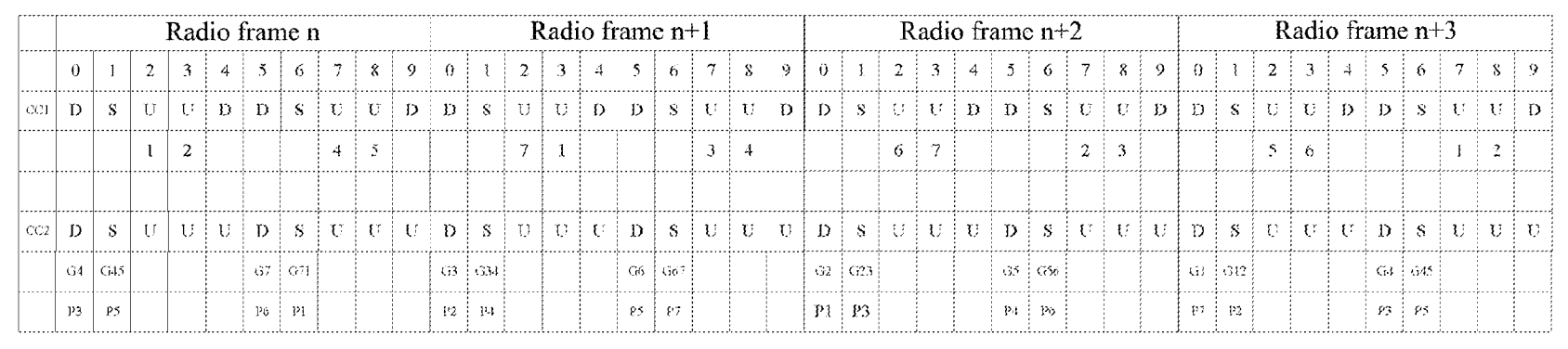

The timing relationship between the uplink scheduling grant, the PUSCH and the ACK/NACK is as shown in FIG. 6, in the FIG. 6, D represents a downlink subframe; S represents a special subframe; U represents an uplink subframe; 1/2/3/4 represent process serial numbers; Gmn represents an uplink scheduling grant of a process m or a process n; Gm represents an uplink scheduling grant of a process m; Pm represents an ACK/NACK feedback of the process m; and Pmn represents an ACK/NACK feedback of the process m or the process n.

When the uplink/downlink configuration 0 is used, with regard to an Uplink Grant sent on subframes 0, 1, 5 and 6, the PUSCH may be sent on a subframe n+k and/or a subframe n+7, and a value of k may refer to the Table 2. For example, G7 can be sent on a subframe 6 of a radio frame n with respect to a process 7, a corresponding timing relationship is n+6 at this point, G1 also can be sent on the subframe with respect to a process 1, and a corresponding timing relationship is n+7 at this point.

Application Example 3

As shown in Table 1, a CC1 uses an uplink/downlink proportion configuration 1, a CC2 uses an uplink/downlink proportion configuration 0. The CC2 performs cross-carrier scheduling on the CC1, a PUSCH is sent on the CC1, and an uplink scheduling grant signaling and an ACK/NACK feedback signaling are sent on the CC2. A timing relationship between the uplink scheduling grant signaling, the PUSCH and the ACK/NACK signaling is identical with an HARQ timing relationship corresponding to an uplink/downlink configuration used by a CC (i.e., the CC1) with less uplink subframes or more downlink subframes (i.e., an HARQ timing relationship of the uplink/downlink configuration 1).

The timing relationship between the uplink scheduling grant, the PUSCH and the ACK/NACK is as shown in FIG. 5, in the FIG. 5, D represents a downlink subframe; S represents a special subframe; U represents an uplink subframe; 1/2/3/4 represent process serial numbers; Gm represents an uplink scheduling grant of a process m; and Pm represents an ACK/NACK feedback of the process m.

Since positions at which the uplink scheduling grant and the ACK/NACK are sent in a process 2 and a process 4 are uplink subframes on the CC2, PUSCH scheduling is not permitted in uplink subframes corresponding to the process 2 and process 4 in the application example.

Application Example 4

As shown in Table 1, a CC1 uses an uplink/downlink proportion configuration 1, a CC2 uses an uplink/downlink proportion configuration 0. The CC2 performs cross-carrier scheduling on the CC1, a PUSCH is sent on the CC1, and an uplink scheduling grant signaling and an ACK/NACK feedback signaling are sent on the CC2. A timing relationship between the uplink scheduling grant signaling, the PUSCH and the ACK/NACK signaling is identical with an HARQ timing relationship corresponding to an uplink/downlink configuration used by a CC (i.e., the CC2) with more uplink subframes or less downlink subframes (i.e., an HARQ timing relationship of the uplink/downlink configuration 0).

The timing relationship between the uplink scheduling grant, the PUSCH and the ACK/NACK is as shown in FIG. 6, in the FIG. 6, D represents a downlink subframe; S represents a special subframe; U represents an uplink subframe; 1/2/3/4 represent process serial numbers; Gmn represents an uplink scheduling grant of a process m or a process n; Gm represents an uplink scheduling grant of a process m; Pm represents an ACK/NACK feedback of the process m; and Pmn represents an ACK/NACK feedback of the process m or the process n.

When feedbacks need to be performed on different processes on the same subframe, different resources can be used (e.g., different channels can be used) to differentiate feedbacks of different processes, and a specific method may refer to the related art.

Application Example 5

As shown in Table 1, a CC1 uses an uplink/downlink proportion configuration 1, a CC2 uses an uplink/downlink proportion configuration 0. The CC1 performs cross-carrier scheduling on the CC2, a PUSCH is sent on the CC2, and an uplink scheduling grant signaling and an ACK/NACK feedback signaling are sent on the CC1. A timing relationship between the uplink scheduling grant signaling, the PUSCH and the ACK/NACK signaling is identical with an HARQ timing relationship corresponding to an uplink/downlink configuration used by the CC1 (i.e., an HARQ timing relationship of the uplink/downlink configuration 1).

The timing relationship between the uplink scheduling grant, the PUSCH and the ACK/NACK signaling is as shown in FIG. 7, in the FIG. 7, D represents a downlink subframe; S represents a special subframe; U represents an uplink subframe; 1/2/3/4 represent process serial numbers; Gm represents an uplink scheduling grant of a process m; and Pm represents an ACK/NACK feedback of the process m.

According to the HARQ timing relationship of the uplink/downlink configuration 1, though a subframe 4 and a subframe 9 of the CC2 are uplink subframes, there is no corresponding downlink subframe for sending the uplink scheduling grant signaling and the ACK/NACK feedback signaling on the CC1, thus the base station does not perform PUSCH scheduling on these two subframes of the CC2.

Application Example 6

As shown in Table 1, a CC1 uses an uplink/downlink proportion configuration 1, a CC2 uses an uplink/downlink proportion configuration 0. The CC1 performs cross-carrier scheduling on the CC2, a PUSCH is sent on the CC2, and an uplink scheduling grant signaling and an ACK/NACK feedback signaling are sent on the CC1. A timing relationship between the uplink scheduling grant signaling, the PUSCH and the ACK/NACK signaling is identical with an HARQ timing relationship corresponding to an uplink/downlink configuration used by the CC2 (i.e., an HARQ timing relationship of the uplink/downlink configuration 0).

Figure 8:
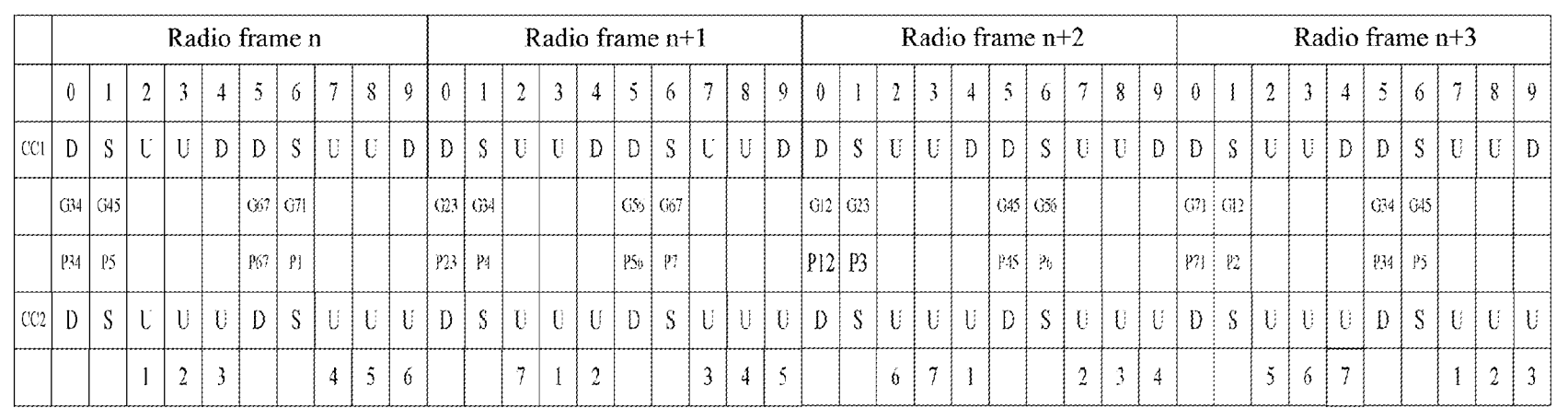

The timing relationship between the uplink scheduling grant, the PUSCH and the ACK/NACK is as shown in FIG. 8, in the FIG. 8, D represents a downlink subframe; S represents a special subframe; U represents an uplink subframe; 1/2/3/4 represent process serial numbers; Gmn represents an uplink scheduling grant of a process m or a process n; Gm represents an uplink scheduling grant of a process m; Pm represents an ACK/NACK feedback of the process m; and Pmn represents an ACK/NACK feedback of the process m or the process n.

Application Example 7

As shown in Table 1, a CC1 uses an uplink/downlink proportion configuration 1, a CC2 uses an uplink/downlink proportion configuration 0. The CC1 performs cross-carrier scheduling on the CC2, a PUSCH is sent on the CC2, and an uplink scheduling grant signaling and an ACK/NACK feedback signaling are sent on the CC1. A timing relationship between the uplink scheduling grant signaling, the PUSCH and the ACK/NACK signaling is identical with an HARQ timing relationship corresponding to an uplink/downlink configuration used by a CC (i.e., the CC1) with less uplink subframes or more downlink subframes (i.e., an HARQ timing relationship of the uplink/downlink configuration 1).

The timing relationship between the uplink scheduling grant, the PUSCH and the ACK/NACK is as shown in FIG. 7, in the FIG. 7, D represents a downlink subframe; S represents a special subframe; U represents an uplink subframe; 1/2/3/4 represent process serial numbers; Gm represents an uplink scheduling grant of a process m; and Pm represents an ACK/NACK feedback of the process m.

Since a subframe 4 and a subframe 9 of the CC2 have no corresponding uplink scheduling grant and/or ACK/NACK, PUSCH scheduling is not performed on these two subframes of the CC2.

Application Example 8

As shown in Table 1, a CC1 uses an uplink/downlink proportion configuration 1, a CC2 uses an uplink/downlink proportion configuration 0. The CC1 performs cross-carrier scheduling on the CC2, a PUSCH is sent on the CC2, and an uplink scheduling grant signaling and an ACK/NACK feedback signaling are sent on the CC1. A timing relationship between the uplink scheduling grant signaling, the PUSCH and the ACK/NACK signaling is identical with an HARQ timing relationship corresponding to an uplink/downlink configuration used by a CC (i.e., the CC2) with more uplink subframes or less downlink subframes (i.e., an HARQ timing relationship of the uplink/downlink configuration 0).

The timing relationship between the uplink scheduling grant, the PUSCH and the ACK/NACK is as shown in FIG. 8, in the FIG. 8, D represents a downlink subframe; S represents a special subframe; U represents an uplink subframe; 1/2/3/4 represent process serial numbers; Gmn represents an uplink scheduling grant of a process m or a process n; Gm represents an uplink scheduling grant of a process m; Pm represents an ACK/NACK feedback of the process m; and Pmn represents an ACK/NACK feedback of the process m or the process n.

Application Example 9

As shown in Table 1, a CC1 uses an uplink/downlink proportion configuration 1, a CC2 uses an uplink/downlink proportion configuration 0. The CC1 performs cross-carrier scheduling on the CC2, a PUSCH is sent on the CC2, and an uplink scheduling grant signaling and an ACK/NACK feedback signaling are sent on the CC1.

The base station uses an HARQ timing relationship of the uplink/downlink configuration 1 during the cross-carrier scheduling through a signaling configuration. That is, a timing relationship between the uplink scheduling grant signaling, the PUSCH and the ACK/NACK signaling adopts the HARQ timing relationship corresponding to the uplink/downlink configuration 1.

The timing relationship between the uplink scheduling grant, the PUSCH and the ACK/NACK is as shown in FIG. 8, in the FIG. 8, D represents a downlink subframe; S represents a special subframe; U represents an uplink subframe; 1/2/3/4 represent process serial numbers; Gmn represents an uplink scheduling grant of a process m or a process n; Gm represents an uplink scheduling grant of a process m; Pm represents an ACK/NACK feedback of the process m; and Pmn represents an ACK/NACK feedback of the process m or the process n.

The above description is only for the embodiments of the present document, which is not used to limit the present document. The present document can have various modifications and changes for the skilled in the art. All the modifications, equivalent substitutions, and improvements, etc. made within the spirit and principle of the present document shall fall into the scope of the claims of the present document.

INDUSTRIAL APPLICABILITY

In conclusion, in the technical scheme provided by the embodiment of the present document, when different CCs use different uplink/downlink proportion configurations, the TDD system is enabled to use the HARQ timing relationships to implement the cross-carrier scheduling and an EICIC function, and also to maintain a lower complexity of devices in the meantime. Therefore, the present document has very strong industrial applicability.

What is claimed is:

1. A data transmission method for a Time Division Duplex (TDD) system, comprising:
a base station sending an uplink scheduling grant signaling to a terminal on a carrier m, and after the base station receives uplink data sent by the terminal through a Physical Uplink Shared Channel (PUSCH) on a carrier n, the base station sending an ACK/NACK feedback signaling corresponding to the PUSCH to the terminal on the carrier m;
wherein, m≠n;
a timing relationship between a subframe by which the base station sends the uplink scheduling grant signaling and/or the ACK/NACK feedback signaling and a subframe where the PUSCH is located is identical with a Hybrid Automatic Repeat Request (HARQ) timing relationship corresponding to an uplink/downlink configuration of the carrier n; or,
the timing relationship between the subframe by which the base station sends the uplink scheduling grant signaling and/or the ACK/NACK feedback signaling and the subframe where the PUSCH is located is identical with an HARQ timing relationship corresponding to an uplink/downlink configuration used by a carrier with more uplink subframes or less downlink subframes between the carrier m and the carrier n; or,
the timing relationship between the subframe by which the base station sends the uplink scheduling grant signaling and/or the ACK/NACK feedback signaling and the subframe where the PUSCH is located is identical with an HARQ timing relationship corresponding to an uplink/downlink configuration used by a carrier with less uplink subframes or more downlink subframes between the carrier m and the carrier n.

2. A data transmission method for a Time Division Duplex (TDD) system, comprising:

after receiving an uplink scheduling grant signaling and/or an ACK/NACK feedback signaling sent by a base station on a carrier m, a terminal sending uplink data through a Physical Uplink Shared Channel (PUSCH) on a carrier n;

wherein, m≠n;

a timing relationship between a subframe where the PUSCH is located and a subframe by which the base station sends the uplink scheduling grant signaling and/or the ACK/NACK feedback signaling is identical with a Hybrid Automatic Repeat Request (HARQ) timing relationship corresponding to an uplink/downlink configuration of the carrier n; or, the timing relationship between the subframe where the PUSCH is located and the subframe by which the base station sends the uplink scheduling grant signaling and/or the ACK/NACK feedback signaling is identical with an HARQ timing relationship corresponding to an uplink/downlink configuration used by a carrier with more uplink subframes or less downlink subframes between the carrier m and the carrier n; or, the timing relationship between the subframe where the PUSCH is located and the subframe by which the base station sends the uplink scheduling grant signaling and/or the ACK/NACK feedback signaling is identical with an HARQ timing relationship corresponding to an uplink/downlink configuration used by a carrier with less uplink subframes or more downlink subframes between the carrier m and the carrier n.

3. A base station for performing data transmission in a Time Division Duplex (TDD) system, comprising at least one processor executing a sending module and a receiving module, wherein, the sending module is configured to: send an uplink scheduling grant signaling to a terminal on a carrier m, and after the receiving module receives uplink data sent by the terminal through a Physical Uplink Shared Channel (PUSCH) on a carrier n, send an ACK/NACK feedback signaling corresponding to the PUSCH to the terminal on the carrier m; and the receiving module is configured to: receive the uplink data sent by the terminal through the PUSCH on the carrier n;

wherein, m≠n;

a timing relationship between a subframe by which the base station sends the uplink scheduling grant signaling and/or the ACK/NACK feedback signaling and a subframe where the PUSCH is located is a Hybrid Automatic Repeat Request (HARQ) timing relationship corresponding to an uplink/downlink configuration of the carrier n; or, the timing relationship between the subframe by which the base station sends the uplink scheduling grant signaling and/or the ACK/NACK feedback signaling and the subframe where the PUSCH is located is an HARQ timing relationship corresponding to an uplink/downlink configuration used by a carrier with more uplink subframes or less downlink subframes between the carrier m and the carrier n; or, the timing relationship between the subframe by which the base station sends the uplink scheduling grant signaling and/or the ACK/NACK feedback signaling and the subframe where the PUSCH is located is an HARQ timing relationship corresponding to an uplink/downlink configuration used by a carrier with less uplink subframes or more downlink subframes between the carrier m and the carrier n.

4. A terminal for performing data transmission in a Time Division Duplex (TDD) system, comprising at least one processor executing a receiving module and a sending module, wherein, the receiving module is configured to: receive an uplink scheduling grant signaling and/or an ACK/NACK feedback signaling sent by a base station on a carrier m; and the sending module is configured to: after the receiving module receives the uplink scheduling grant signaling and/or the ACK/NACK feedback signaling sent by the base station on the carrier m, send uplink data through a Physical Uplink Shared Channel (PUSCH) on a carrier n;

wherein, m≠n;

a timing relationship between a subframe where the PUSCH is located and a subframe by which the base station sends the uplink scheduling grant signaling and/or the ACK/NACK feedback signaling is a Hybrid Automatic Repeat Request (HARQ) timing relationship corresponding to an uplink/downlink configuration of the carrier n; or, the timing relationship between the subframe where the PUSCH is located and the subframe by which the base station sends the uplink scheduling grant signaling and/or the ACK/NACK feedback signaling is an HARQ timing relationship corresponding to an uplink/downlink configuration used by a carrier with more uplink subframes or less downlink subframes between the carrier m and the carrier n; or, the timing relationship between the subframe where the PUSCH is located and the subframe by which the base station sends the uplink scheduling grant signaling and/or the ACK/NACK feedback signaling is an HARQ timing relationship corresponding to an uplink/downlink configuration used by a carrier with less uplink subframes or more downlink subframes between the carrier m and the carrier n.

* * * * *